(12) United States Patent
Norman

(10) Patent No.: US 10,817,575 B2
(45) Date of Patent: *Oct. 27, 2020

(54) PERFORMING AN OBJECT RELATIONAL MODEL QUERY AGAINST A DATABASE THAT INCLUDES FIELDS DEFINED AT RUNTIME

(71) Applicant: LockPath, Inc., Overland Park, KS (US)

(72) Inventor: Timothy R. Norman, Overland Park, KS (US)

(73) Assignee: LockPath, Inc., Overland Park, KS (US)

( * ) Notice: Subject to any disclaimer, the term of this patent is extended or adjusted under 35 U.S.C. 154(b) by 341 days.

This patent is subject to a terminal disclaimer.

(21) Appl. No.: 15/910,309

(22) Filed: Mar. 2, 2018

(65) Prior Publication Data
US 2018/0189397 A1    Jul. 5, 2018

Related U.S. Application Data

(63) Continuation of application No. 14/642,641, filed on Mar. 9, 2015, now Pat. No. 9,940,392.

(60) Provisional application No. 62/012,308, filed on Jun. 14, 2014.

(51) Int. Cl.
*G06F 16/951* (2019.01)
*G06F 16/242* (2019.01)

(52) U.S. Cl.
CPC ........ *G06F 16/951* (2019.01); *G06F 16/2423* (2019.01)

(58) Field of Classification Search
CPC .......................... G06F 16/951; G06F 16/2423
USPC .............. 707/769, 714, 772, 786, 802, 805, 707/999.102
See application file for complete search history.

(56) References Cited

U.S. PATENT DOCUMENTS

| | | | |
|---|---|---|---|
| 9,244,838 B2 * | 1/2016 | Lopes ................. | G06F 12/0804 |
| 2006/0259509 A1 * | 11/2006 | Stolte ................... | G06F 16/212 |
| 2007/0192278 A1 * | 8/2007 | Anderson ........... | G06F 16/9535 |
| 2014/0372406 A1 * | 12/2014 | Hoffman ................ | G06F 16/21 707/714 |

\* cited by examiner

*Primary Examiner* — Dung K Chau
(74) *Attorney, Agent, or Firm* — Perkins Coie LLP

(57) ABSTRACT

A facility for querying user-defined database columns is described. The facility receives a database query referring to one or more database columns, at least one of the referred-to database columns being a user-defined database column. The facility provides access to a database query result generated for the perceived database query via a programmatic object.

20 Claims, 7 Drawing Sheets

PERFORMING AN OBJECT RELATIONAL MODEL QUERY AGAINST A DATABASE THAT INCLUDES FIELDS DEFINED AT RUNTIME

CROSS-REFERENCE TO RELATED APPLICATIONS

This application is a continuation of U.S. patent application Ser. No. 14/642,641 filed on Mar. 9, 2015, which claims the benefit of U.S. Provisional Patent Application No. 62/012,308 filed on Jun. 14, 2014, all of which are incorporated by reference herein in their entireties.

This application is related to the following applications, each of which is hereby incorporated by reference in its entirety: U.S. Provisional Patent Application No. 62/012,308, filed on Jun. 14, 2014; U.S. patent application Ser. No. 13/646,005, filed on Oct. 5, 2012; U.S. Provisional Patent Application No. 61/545,543, filed on Oct. 10, 2011; and U.S. Provisional Patent Application No. 61/545,195, filed on Oct. 9, 2011.

TECHNICAL FIELD

The described technology is directed to the field of databases.

BACKGROUND

A relational database stores data in a structured way. In particular, a relational database is made up of one or more tables, each table divided into rows each representing a different data item and columns each representing a different kind of information about each data item. Within a table, data is stored in fields that each constitute the intersection of one row with one column. The set of columns in a particular table and their types are said to constitute that table's schema, while the schemas of a database's tables together with the identities of those tables are collectively said to constitute the database's schema. The database's schema is also sometimes referred to as its "database model" or "data model."

Object-relational mapping is a technique for making the contents of a relational database accessible for retrieval and modification by an object-oriented computer program. The mapping effectively creates a virtual object database that can be used from within and object-oriented program. While it's possible for data available from this virtual object database to include all of the data contained by the relational database, in many cases the virtual object database is defined based on a query against the relational database that selects certain of its rows and columns, and optionally performs transformations on them.

To implement object-relational mapping, an object oriented programming language is used to express an object relational model (also "ORM" or "object model" herein) that is mapped to a data model of a relational database. Operations on the data are then conducted according to the object model. In particular, database commands are not issued directly to the database. Instead, object methods are executed within the object model and values are changed within the object model. When a query is made for the relational database or changes to the data are made, those queries and changes are translated to database commands, and those commands are sent to the database.

A type class (or "object") is the root of the object model. A type class represents type declarations: class types, interface types, array types, value types, enumeration types, type parameters, generic type definitions, and open or closed constructed generic types. The members of the type class are used to get information about a type declaration, such as constructors, methods, fields, properties, and events of a class, in addition to the module and assembly in which the class is deployed.

An object model may have an entity class, class member, association, and method that map to a database model having a table, field, foreign key relationship, and stored procedure or function, respectively. In this example, a database table is represented by an entity class. A foreign key relationship defines a relationship between two database tables with a primary-key identified in a first table (or a field in the first table) and a foreign-key identified in another table (or a field or multiple fields in another table).

Entity objects (or simply "entities") have properties (or "attributes"), methods (also called "functions"), and data. A property may have an accessor that contains executable statements associated with getting (or "reading") or setting (or "writing") the property. Thus, an accessor is used to obtain data from the database.

Entity objects may have expressions or expression trees that represent a node in a tree-like data structure. Each node is an expression (i.e., a method call or an operation). Code represented by expression trees can be compiled, which enables dynamic modification of executable code, the execution of queries and databases, and the creation of queries.

A lambda expression is one of any number of expressions (and expression types) that is used to build an expression tree. A lambda expression is a means of defining an abstract algorithm before it is known to what data that algorithm will be applied.

An assembly is a collection of entity types and resources that are built to work together and form a logical unit of functionality. An assembly contains the information needed at runtime so that the application is aware of type implementations.

The type class is the root of the reflection functionality and is the primary way to access metadata. Reflection provides objects that encapsulate assemblies, modules, and types. Reflection can be used to dynamically create an instance of a type (object), bind the type (object) to an existing object, or get the type from an existing object. The type's methods may be invoked or the fields and properties of the type may be accessed.

Some ORM systems contain classes that are used to generate an ORM object model that represents the structure and content of a relational database. These mappings are identified as namespaces. For example, a mapping namespace class (object) may designate a property to represent a database association (such as a foreign-key relationship), a field attribute (to associate a class with a field (column) and a database table), an accessor to a member, a metaassociation to represent an association relationship between two entity types, a mapping between a context method and a database function, a meta-data table to represent an abstraction of a database table view, a meta-data type to represent a mapping of a domain object type to a field (column) of a database table, and other mappings.

One type of namespace is a reflection namespace. The reflection namespace contains the types that retrieve information about assemblies, modules, members, parameters, and other entities by examining their metadata. These types can also be used to manipulate instances of loaded types. For example, a namespace object represents an abstract root object for a data source. Properties can be referenced by namespaces.

A runtime loader manages application domains. This management includes loading each assembly into the appropriate application domain and controlling the memory layout of the type hierarchy within each assembly. Assemblies contain modules, modules contain types, and types contain members.

Rows in a relational database table do not have unique identities. Since each row has a unique primary key, no two rows share the same key value. However, this fact constrains only the contents of the database table.

When a new row is retrieved from a database, the row is logged in an identity table by its primary key, and a new object is created. When that same row is retrieved, the original object instance is handed back to the application. Thus, the data context manages the object identity and translates the concept of identity as seen by the database (e.g., primary key) into the concept of identity accepted by the ORM (e.g., instances). The ORM application only sees the object in the state from which it was first retrieved. An identity table acts as a cache of all previously retrieved objects.

A data context provides the mapping of all object entities to the database model. It is through the data context that the application containing the object entities can query the database. It is through the data context that changes to the database can be implemented.

Data management tasks in object-oriented programming systems typically are implemented by manipulating objects that are almost always non-scalar variables. Scalar variables hold only a single value at a time, whereas non-scalar variables may hold composite variables, such as arrays, lists, hash, records, and other non-scalar variable types.

Many database systems, such as structured query language database management systems and other relational database management systems, can only store or manipulate scalar values, such as integers and strings organized within tables. Thus, ORM systems convert object values from object data structures into groups of simpler values for storage in a database and convert the database values back to object values upon retrieval. The process of retrieving data from a database and mapping the data to an ORM object is sometimes referred to as touching the object.

As mentioned above, an ORM system may be used as a basis to develop an object-oriented program that retrieves and displays a portion of the data in a database, and enable its revision by a user. In some cases, such an application also causes various transformations to be performed on the data before displaying it, either as an integral part of the retrieval or subsequent to the retrieval.

Two conventional approaches may be used to design the particular retrieval and transformation to be performed by such an application. In a first, a programmer specifies a textual query as part of developing the application. Because the textual query is parsed into an expression tree and compiled into a mapped object model, the textual query depends on the schema of the database known at the time the mapped object model is compiled.

In a second conventional approach used to design the particular retrieval and transformation to be performed by such an application, a programmer, as part of developing the application, incorporates into the application a mechanism that enables a non-expert user to visually construct a query by manipulating a visual user interface, such as by using drag-and-drop and/or pull-down selection user interface techniques. The implementation of this user interface similarly depends on the schema of the database known at the time the application is compiled.

DETAILED DESCRIPTION

Figure 1:
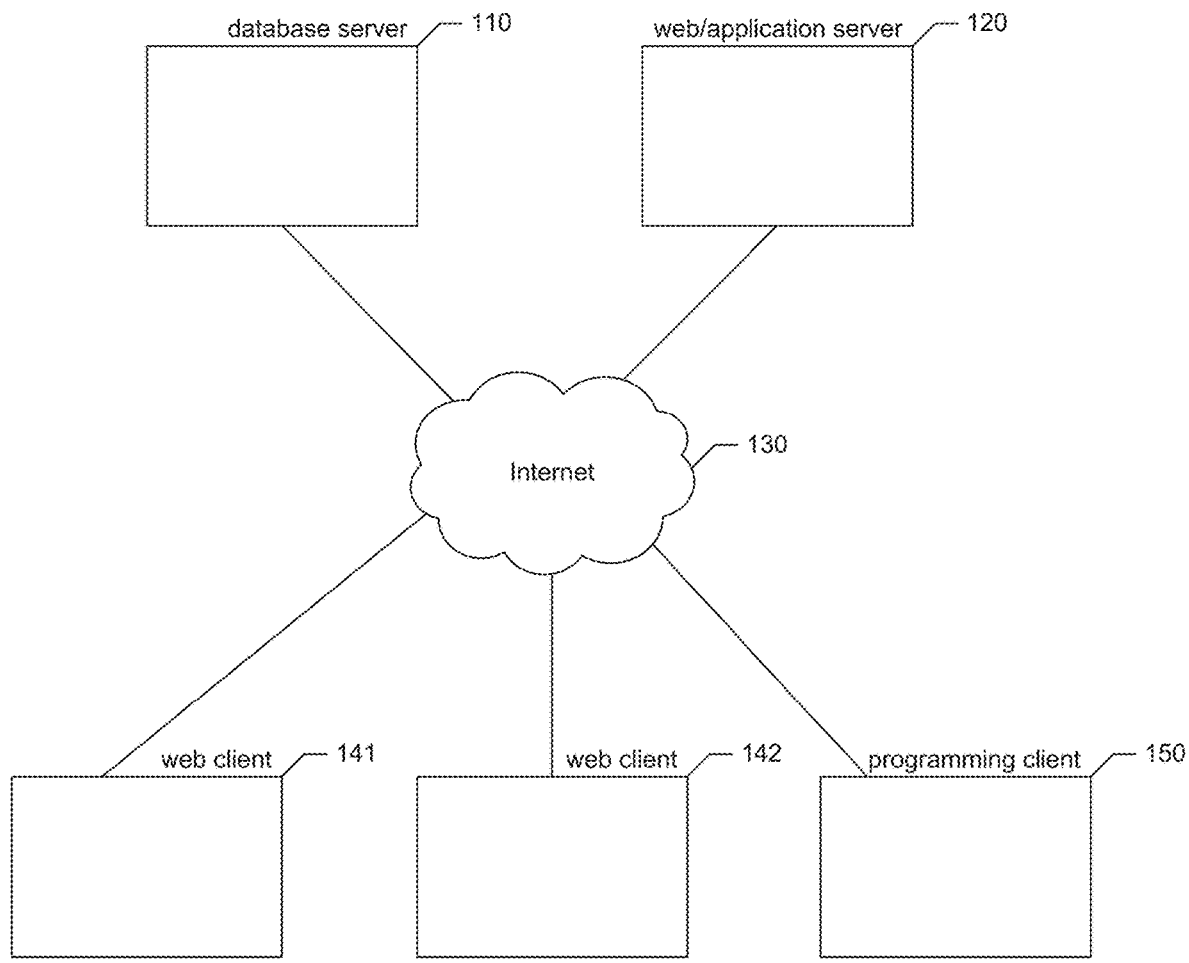
FIG. 1 is a network diagram showing a sample environment in which the facility operates in some embodiments.

The inventor has inventor has recognized that, where an application or other program accesses a database via an ORM, conventional approaches to specifying a query—either textually or visually—limit the query to aspects of the database schema known at the time the application and/or mapped object model is compiled. The inventor has further recognize that, as a result, such queries are unable to address aspects of the database schema that are added by the user, referred to herein as "dynamic data."

The inventor has accordingly determined that techniques for generating and applying ORM queries that address dynamic data would have significant utility.

In view of such recognition, the inventor has developed a software and/or hardware facility for performing an object relational model query against a database that includes fields defined at runtime ("the facility"). In some embodiments, the facility performs an object relational model query against a database that also includes tables and/or relationships defined at runtime.

In some embodiments, the facility employs a runtime object syntax expression tree translation architecture ("Rosetta"). Rosetta enables the facility to transform an abstract query against dynamic data into a concrete query in a target ORM query language such as Microsoft LINQ. An object-oriented program can then interact with an object generated from the transformed version of the query in order to perform the query and access the results. The object performs the query by causing relational database instructions—such as SQL queries—automatically generated from the transformed query to be executed against the database.

In various embodiments, the facility supports various approaches to generating an abstract Rosetta query. In some embodiments, a user (including a developer) can generate a Rosetta query textually, in a Rosetta query language that bears substantial similarity to the target ORM query language, such as Microsoft LINQ. In such embodiments, the facility first parses the textual query into a hierarchical Rosetta expression tree. The facility then transforms the Rosetta expression tree into a corresponding LINQ expression tree. The resulting Rosetta expression tree can be submitted to a translation engine, such as a LINQ-to-SQL Provider, for translation into database commands.

In some embodiments, a user can generate a Rosetta query visually, using a visual query builder user interface that is configured in accordance with a schema of the database that includes its dynamic data. The user's interactions with the visual query builder have the effect of generating a Rosetta expression tree. As above, the facility transforms the Rosetta expression tree into a corresponding LINQ expression tree, which can be submitted to a translation engine for translation into database commands.

In some embodiments, the Rosetta query language is modeled on the Microsoft LINQ query language, including the LINQ query language's rich expression capabilities, its type projection functionality, and its ability to express complex statistical aggregates. The Rosetta query language, however, includes constructs not present in LINQ for referring to dynamic data. In some such embodiments, the facility implements a dedicated class that mirrors much of LINQ's templatized querying, grouping, aggregation, and projection methods. Because these templatized methods normally require types that cannot be known at runtime, they employ a special LUMARecord base class, which facilitates the deferral of type-specific mappings to late-bound runtime processes.

In some embodiments, rather than exposing a full-database analog in which entire database tables are each accessed as properties of a single class, the facility employs a MetaRecordSet class which is instantiated as a particular database table. This approach provides a known starting point for intercepting and translating incoming expressions.

In some embodiments, during its transformation of a Rosetta tree into a corresponding LINQ expression tree, the facility employs a field-pathing technique that uses a metadata cache to facilitate arbitrary field access.

In some embodiments, the facility's translation of the Rosetta expression tree into a corresponding LINQ expression tree begins at the root of the Rosetta expression tree; its nodes are traversed recursively to search for candidate elements in need of translation. These are often methods or field accessors specific to the manner in which the addition of dynamic data added to the database by users is represented. The facility translates these into expressions compatible with the LINQ model; translates field paths into nested property accessors; and detects and optimizes known method calling patterns. In some embodiments, the facility's translation also condenses constant expressions not yet evaluated, and resolves type ambiguities that cannot be resolved until runtime. Examples of such type ambiguities include, for example, integer versus decimal, date versus date-time, string versus numeric, nullable versus non-nullable, etc. The facility assembles these translated expression fragments into a logically-identical and structurally-similar LINQ tree.

In some embodiments, Rosetta queries include field paths represented as lists of integers representing field IDs. System tables and their system fields cannot be altered by end-users; a handful of system fields that are also automatically created for user-created tables. In some embodiments, these are: Id, Version, Created At, Created By, Updated At, Updated By, Deleted (a soft-deletion flag) and a Workflow Stage ID. As a way of providing a more intuitive means of working with field paths, system tables and fields are granted a pre-defined alias. Likewise, users creating their own components and fields are required to give each a unique alias. The facility stores a mapping between these aliases and the associated component or field for use in translating the former to the latter. With this aliasing system in place and a Rosetta translation layer able to account for it, developers are free to author criteria via aliases rather than lists of arbitrary component or field IDs: in place of 'records.Where (r=>r.GetString(54921, 4569, 8871, 90914)=="Bach")', a developer may write "'records.Where(r=>r.GetString("CreatedBy", "FavoriteSong", "Composer", "LastName")=="Bach")'.

By behaving in some or all of these ways, the facility makes it possible to query dynamic data via an ORM interface.

FIG. 1 is a network diagram showing a sample environment in which the facility operates in some embodiments. In the sample environment, a number of computer systems are connected by a network such as the Internet 130: computer systems 110, 120, 141, 142, and 150. A database server computer system 110 maintains one or more databases, such as relational databases. The database server processes database commands against the databases, such as commands to add a row to an existing table, modify a row, or delete a row; add a column to an existing table, or create a new table; perform a query and return a result; etc. A web/application server 120 executes software for accessing the contents of databases managed by the database server. In particular, the software can include a web application, implemented in an object-oriented programming language, that accesses the databases via object models, such as those implemented in connection with the application on the web/application server. A programming client 150 is used to develop the application, the object models, and/or queries used in the application to select data from the database for display, and manipulations thereon. Web clients such as web clients 141 and 142 are used by end users of the application to interact with the application. In some embodiments, some or all of the functionality described above as being located in the web/application server is instead or in addition implemented in some or all of the web clients.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
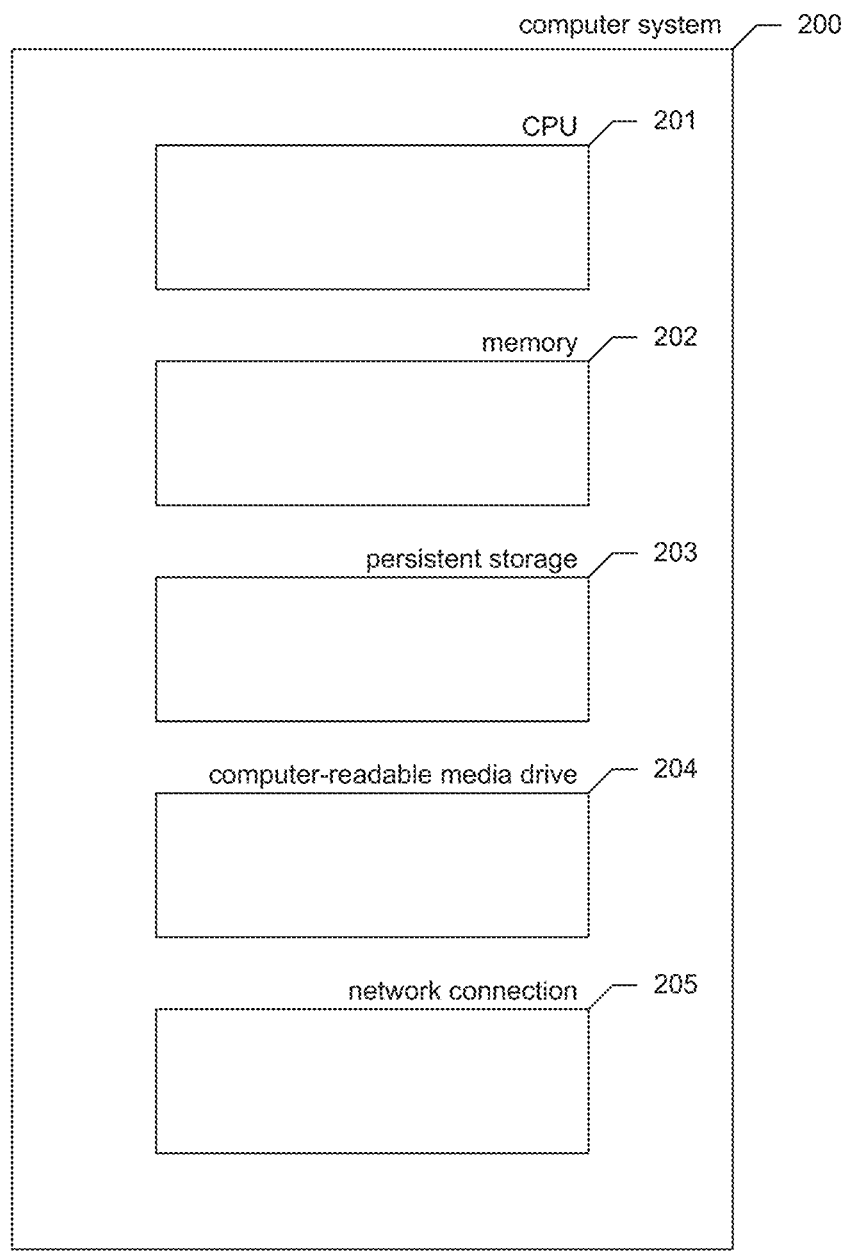
FIG. 2 is a block diagram showing some of the components typically incorporated in at least some of the clients, servers, and other devices on which the facility operates.

FIG. 2 is a block diagram showing some of the components typically incorporated in at least some of the clients, servers, and other devices on which the facility operates. In various embodiments, these devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: one or more central processing units ("CPUs") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems and similar devices to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components. The facility may execute on such devices directly, or through one or more layers of virtualization.

Figure 3:
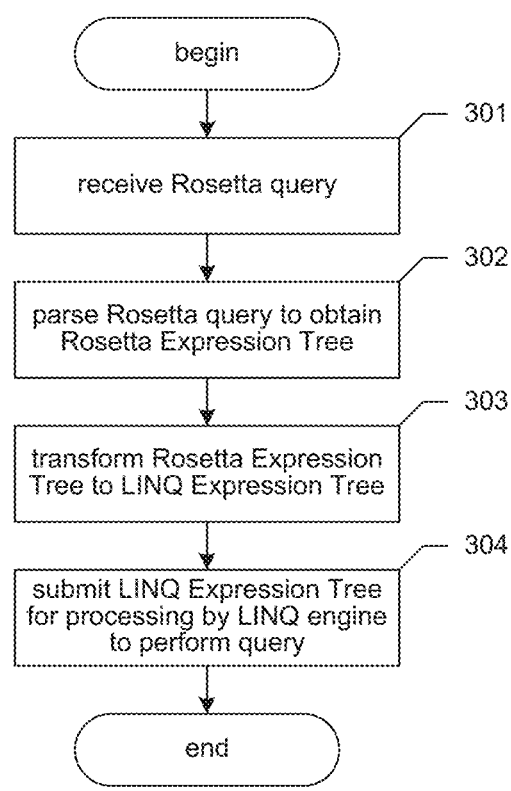
FIG. 3 is a flow diagram showing steps typically performed by the facility in order to perform an object relational model query against dynamic data.

FIG. 3 is a flow diagram showing steps typically performed by the facility in order to perform an object relational model query against dynamic data. In step 301, the facility receives a Rosetta query against a database containing dynamic data. The Rosetta query is expressed in a form generally corresponding to a conventional ORM query language such as that of LINQ, but with portions relating to dynamic data that cannot be processed by the conventional ORM.

Figure 4:
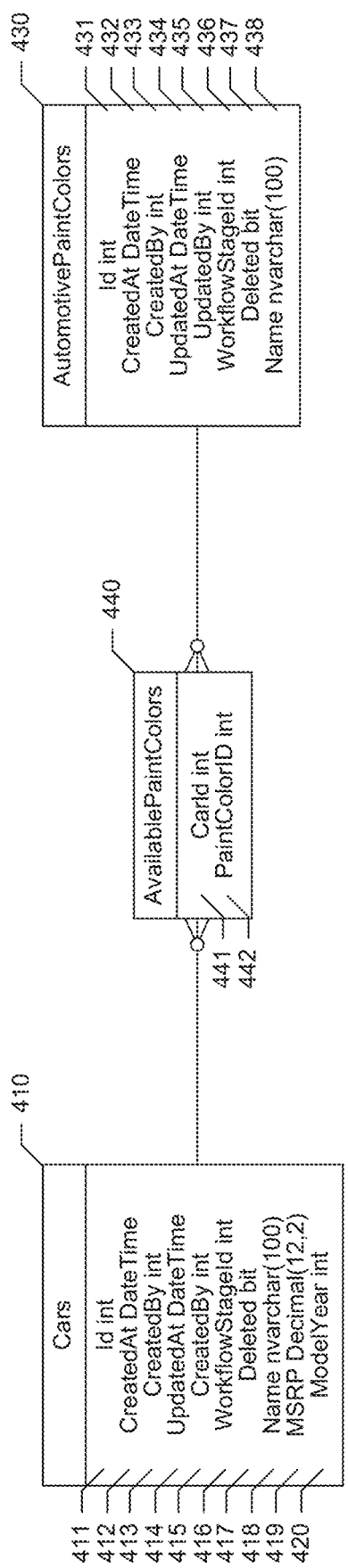
FIG. 4 is a schema diagram showing a sample database schema that is the subject of a sample Rosetta query discussed below.

FIG. 4 is a schema diagram showing a sample database schema that is the subject of a sample Rosetta query discussed below. The schema contains three tables: a Cars table 410 in which each row corresponds to a different automobile available for purchase and is uniquely identified by an ID column 411; an AutomotivePaintColors table 430 in which each row corresponds to a different paint color and is uniquely identified by an ID column 431; and an AvailablePaintColors table 440 in which each row maps between a row of the Cars table and a row of the AutomotivePaintColors table corresponding to the color of the car to which the row of the Cars table corresponds. These tables were created by the user in their entireties, and constitute dynamic data within the database. When a user defines these tables, the facility renders a relational LINQ model of the entire database and compiles a runtime library to not only create classes representing the new user-defined tables and relations, but to also incorporate those into the rest of the relational model. As the user creates each component and field, the user provides an alias for each that is tracked in the facility's Components and Fields tables. While user actions are typically component and field Id driven, the examples here will use aliases for clarity.

After addressing layout and permissioning, end users can populate these tables with data. To access the individual fields or related records for any arbitrary runtime record, each of the LINQ classes representing the data tables are derived from the LUMARecord class. LUMARecord provides a multitude of accessors to retrieve data out of any class that builds upon it. These accessors generally accept either field Ids or aliases and have variations to accommodate the core primitive types as well as single and multi-record relations.

When working directly with native LINQ to SQL, any filtering, selection, grouping, etc. expressions can be built around nearly any C# operation. Only the select few that can be translated to SQL will actually work, however; the remainder will throw an exception at runtime (e.g. "Db.Users.Where(u=>u.GetHash( )==555);" will throw exception "Cannot translate 'GetHash' to SQL."). By the same measure, LINQ to SQL has no knowledge of LUMARecord or how its methods and field paths map to the LINQ to SQL model generated at runtime.

Whereas LUMARecord represents an arbitrary record, MetaRecordSet represents an arbitrary table. It is likewise a comparatively simple task for a developer to author a query around known aliases that can be fed to Rosetta at runtime to include user additions to the model, i.e., dynamic data. The crux is that, in order for LINQ to generate SQL, it has to know the exact types and properties it's working with, and has no means of deducing that MetaRecordSet, LUMARecords and the methods associated with them would be useful for that purpose, or that they have any other meaning than arbitrary constructs that have no mapping to any tables, columns or stored procedures that are in its domain.

A user constructs a query of the database to see what, if any, cars fall within the user's criteria: it costs less than $50 k after taxes; it is no older than 2012; and it's painted the user's favorite color. The results are used to populate a simple list, so the user opts to get just an embellished name and Id of each rather than the full car records. Table A below shows a sample textual Rosetta query that the user constructs for this purpose.

TABLE A

| | Example 1 Rosetta Code |
|---|---|
| 1 | Float taxRate = .0785; |
| 2 | MetaRecordSet carShoppingResults = new MetaRecordSet("Cars").Where(c => |
| 3 | c.GetDouble("MSRP")*taxRate <= 50000 && c.GetInt("ModelYear") >= 2012 && |
| 4 | c.GetSubRecords("AvailablePaintColors").Any(pc => pc.GetString("PaintColorID", |
| 5 | "Name") == "Metallic |
| 6 | Mint Green")).Select(c => new NameValuePair( ) { Name = c.GetString("Name") + |
| 7 | "(" +c.GetString("ModelYear") + ")", Id = c.GetInt("Id") }); |

Rather than specifying this query textually, in some embodiments the user can specify this query visually using a visual user interface.

Figure 5:
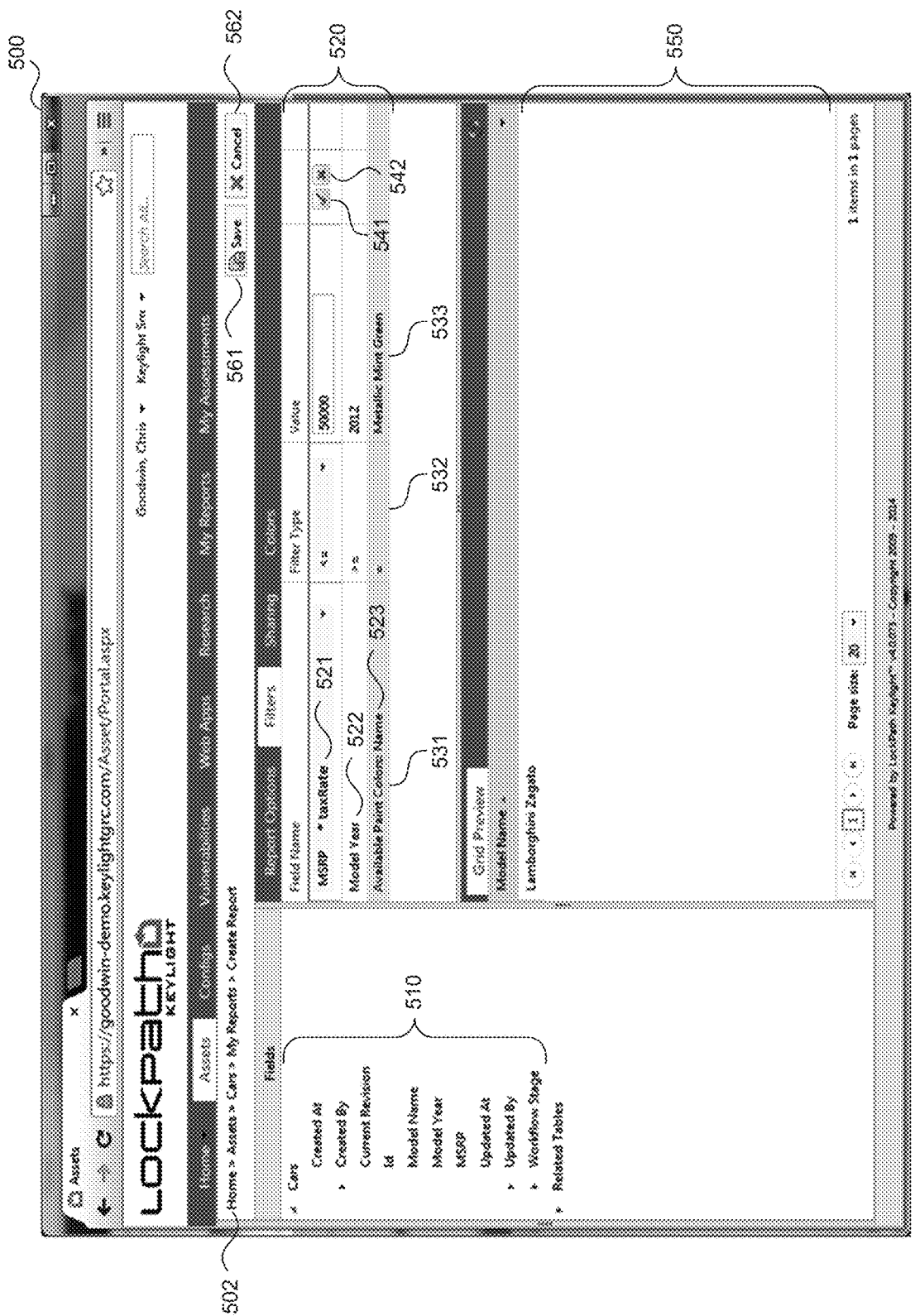
FIG. 5 is a screenshot diagram showing a visual user interface provided by the facility for generating visual Rosetta queries in some embodiments.

FIG. 5 is a screenshot diagram showing a visual user interface provided by the facility for generating visual Rosetta queries in some embodiments. The diagram shows a screenshot 500. Within it, an indication 501 shows a path to the Cars table, and further indicates that a report is being created against this table. In a filters pane 520, the user visually constructs the query. The visual query as shown is comprised of rows each specifying a field name 531, a filter type 532, and a value 533. For example, it can be seen that form of the criteria specified by the user is that Model Year is greater than or equal to the value 2012. As shown, the criteria to which each of these rows corresponds are intersected—ANDed together within the query. In various embodiments, however, more sophisticated combinations of criteria are available, including those that use additional Boolean operators, precedence specifiers, etc. The screenshot also includes a grid preview pane 550, as well as a control 561 for saving the report and its query, and a control 562 for cancelling the creation of the report.

Returning to FIG. 3, in step 302, the facility parses the Rosetta query received in step 301 to obtain a Rosetta expression tree in which the contents of the Rosetta query are organized into a hierarchical structure that is roughly the same as the hierarchical structure into which LINQ queries are transformed for translation into SQL for application against an SQL database. (In some embodiments, where the user generates the query visually using the visual user interface shown in FIG. 5, the facility generates this Rosetta expression tree directly, thus obviating step 302.) Table B below shows the result of parsing the textual Rosetta query shown in Table A above.

TABLE B

Example 1 Rosetta Expression Tree

```
1    Call(Select)
2      Call(Where)
3        Constant(MetaRecordSet("Cars"))
4        Lambda(LUMARecord c) =>
5          Operator(&&)
6            Operator(&&)
7              Operator(<=)
8                Operator(*)
9                  c.GetDouble("MSRP")
10                 Constant(0.0785)
11               Constant(50000)
12             Operator(>=)
13               c.GetInt("ModelYear")
14               Constant(2012)
15           Call(Any)
16             [MetaRecordSet]c.GetSubRecords("AvailablePaintColors")
17             Lambda(LUMARecord pc) =>
18               Operator(==)
19                 pc.GetString("PaintColorID", "Name")
20                 Constant("Metallic Mint Green")
21       Lambda(LUMARecord c) =>
22         Call(NameValuePair constructor)
23           Operator(=)
24             [NameValuePair]Name
25             Operator(+)
26               Operator(+)
27                 c.GetString("Name")
28                 Constant("(")
29               Operator(+)
30                 c.GetInt("ModelYear")
31                 c.Constant(")")
32           Operator(=)
33             [NameValuePair]Id
34             c.GetInt("Id")
```

In Table B above, the portions of the Rosetta expression tree that refer to dynamic or other runtime data, and are therefore unintelligible to LINQ, are underlined. These include the lambda expressions in lines 4, 17, and 21, as well as the dynamic table names in lines 3 and 16 and the dynamic column names in lines 9, 13, 19, 27, 30, and 34.

In step 303, the facility transforms the Rosetta expression tree, such as the one shown above in Table B, into a LINQ expression tree. The performance of step 303 is discussed in greater detail in connection with FIG. 6 below.

Figure 6:
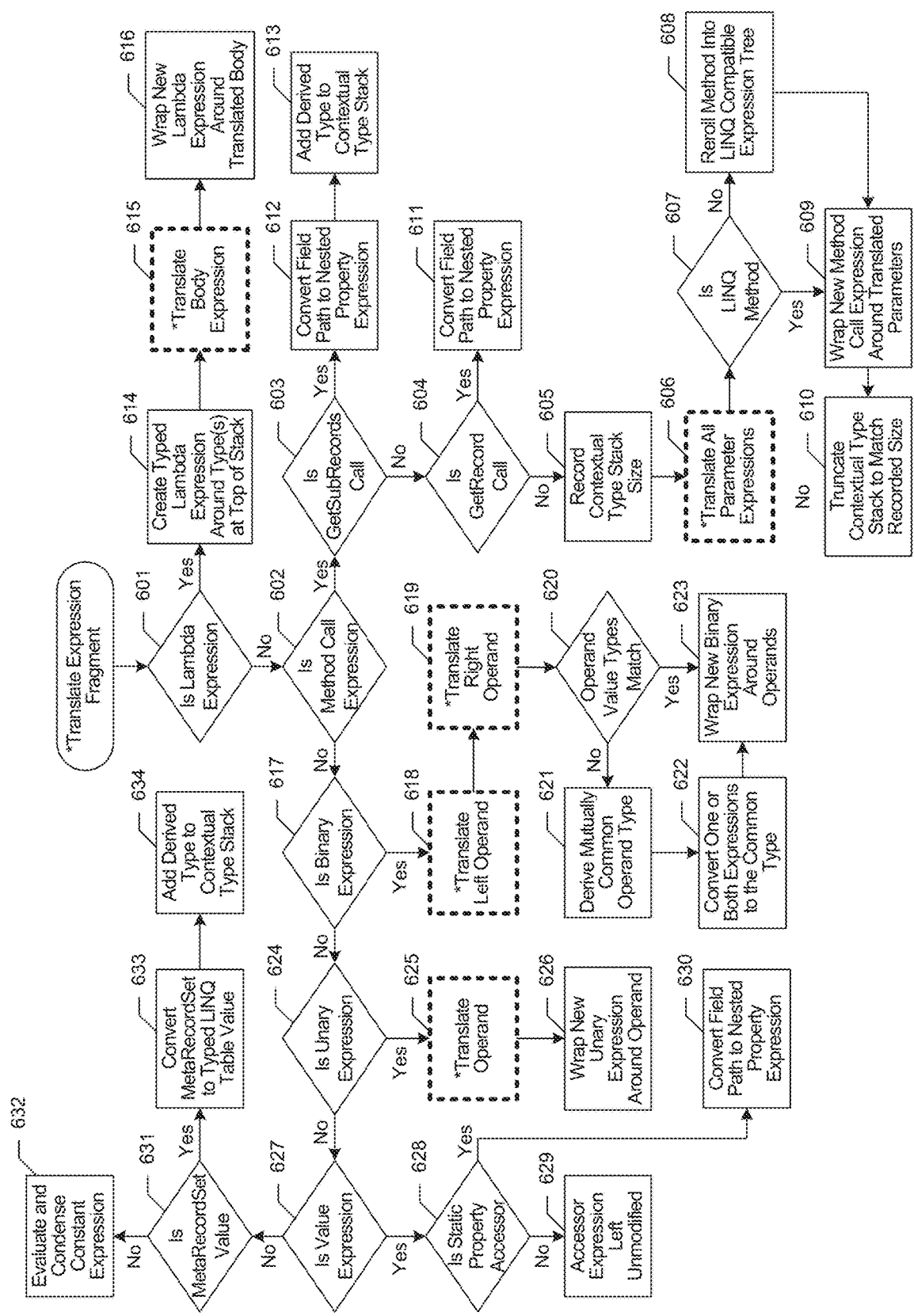
FIG. 6 is a flow diagram showing steps typically performed by the facility in order to transform a Rosetta expression tree into a LINQ expression tree.

FIG. 6 is a flow diagram showing steps typically performed by the facility in order to transform a Rosetta expression tree into a LINQ expression tree. It should be noted that, as shown, these steps call themselves recursively. That is, in each of steps 606, 615, 618, 619, and 625, whose borders are shown with broken lines, the facility begins a new iteration of these steps in the oval above step 601. These steps are called for a particular portion of a Rosetta expression tree. Initially, these steps are performed with respect to the root node of the Rosetta expression tree; the recursive calls from steps 606, 615, 618, 619, and 625 ultimately result in a complete traversal of the Rosetta expression tree, and a transformation of the complete Rosetta expression tree into the corresponding LINQ expression tree.

Also, throughout the entire recursive calling pattern among these steps, the facility maintains a single, global contextual type stack. The facility pushes types onto the contextual type stack in steps 613 and 634, and pops type off of the contextual type stack in step 610.

In step 601, if the expression fragment is a lambda expression, then the facility continues in steps 614, else the facility continues in step 602. In step 602, if the expression fragment is a method call expression, then the facility continues in step 603, else the facility continues in step 617.

In step 603, if the expression fragment is a call to the GetSubRecords function, then the facility continues in step 612, else the facility continues in step 604. In step 604, if the expression fragment is a call to the GetRecord function, then the facility continues in step 611, else the facility continues in step 605. In step 605, the facility records the present size of the contextual type stack. In step 606, the facility recursively calls these steps with respect to the parameter expressions within the GetRecord column. After these recursive calls return, the facility continues in step 607. If the expression fragment is a LINQ method, then the facility continues in step 609, else the facility continues in step 608. In step 608, the facility rerolls the method into a LINQ-compatible expression tree. After step 608, these steps conclude.

In step 609, where the expression fragment is a LINQ method, the facility wraps a new method call expression around the parameters translated in step 606. In step 610, the facility truncates the contextual type stack to match the size of the contextual type stack recorded in step 605. After step 610, these steps conclude.

In step 611, where the expression fragment is a GetRecord call, the facility converts the field path of the GetRecord call to a nested property expression. After step 611, these steps conclude.

In step 612, where the expression fragment is a GetSubRecords call, the facility converts the field path of the GetSubRecords call to a nested property expression. In step 613, the facility adds a derived type to the contextual type stack. After step 613, these steps conclude.

In step 614, where the expression fragment is a lambda expression, the facility creates a typed lambda expression based upon the type or types that are at the top of the contextual type stack based upon earlier processing in these steps. In step 615, the facility recursively calls these steps to translate the body expression of the lambda expression. On return, in step 616, the facility wraps a new lambda expression around the body translated in step 615. After step 616, these steps conclude.

In step 617, where the expression fragment is not a method call expression, if the expression fragment is a binary expression, then the facility continues at step 618, else the facility continues in step 624. In step 618, the facility recursively calls these steps to translate the left operand of the binary expression. On return, in step 619, the facility recursively calls these steps to translate the right operand of the binary expression. On return, in step 620, if the operand values of the translated left and right operands match, then the facility continues in step 623, else the facility continues in step 621. In step 621, the facility derives from the operand value types of the left and the right operand a mutually common operand type. In step 622, for each of the two translated operands, if it is not of the derived common type, the facility converts it to the derived common type. In step 623, the facility wraps a new binary expression around the operands, subject to any translation in step 622. After step 623, these steps return.

In step 624, where the expression fragment is not a binary expression, if the expression fragment is a unary expression, then the facility continues in step 625, else the facility continues in step 627. In step 625, the facility recursively calls these steps to translate the single operand of the unary expression. On return, in step 626, the facility wraps a new unary expression around the operand translated in step 625. After step 626, these steps return. In step 627, where the expression fragment is not a unary expression, if the expression fragment is a value expression, then the facility continues in step 628, else the facility continues in step 631. In step 628, if the expression fragment is a static property accessor, then the facility continues in step 630, else the facility continues in step 629. In step 629, the facility leaves the accessor expression unmodified. After step 629, these steps return.

In step 630, where the expression fragment is a static property accessor, the facility converts the field path of the static property accessor to a nested property expression. After step 630, these steps return.

In step 631, where the expression fragment is not a value expression, if the expression fragment is a MetaRecordSet value, then the facility continues in step 633, else the facility continues in step 632. In step 632, the expression fragment is a constant expression, and the facility evaluates and condenses that constant expression. After step 632, these steps return.

In step 633, where the expression fragment is a MetaRecordSet value, the facility converts the MetaRecordSet value to a typed LINQ table value. In step 634, the facility adds the derived type of the typed LINQ table value to the contextual typed stack. After step 634, these steps return.

Those skilled in the art will appreciate that the steps shown in FIG. 6 and in each of the other flow diagrams discussed herein may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Table C below shows the LINQ expression tree generated for the facility based upon the sample Rosetta expression tree shown in Table B. The underlined portions of the LINQ expression tree correspond to the underlined portions of the Rosetta expression tree.

TABLE C

Example 1 LINQ Expression Tree

| | |
|---|---|
| 1 | Call(Select) |
| 2 | Call(Where) |
| 3 | Constant(Linq.Table<.LockPath.Keylight.AcmeMotors.Cars) |
| 4 | Lambda(.LockPath.Keylight.AcmeMotors.Cars c) => |
| 5 | Operator(&&) |
| 6 | Operator(&&) |
| 7 | Operator(<=) |
| 8 | Operator(*) |
| 9 | c.MSRP |
| 10 | Constant(0.0785) |
| 11 | Constant(50000) |
| 12 | Operator(>=) |
| 13 | c.ModelYear |
| 14 | Constant(2012) |
| 15 | Call(Any) |
| 16 | [Linq.EntitySet< AvailablePaintColors >]c.AvailablePaintColors |
| 17 | Lambda(AutomotivePaintColors pc) => |
| 18 | Operator(==) |
| 19 | pc.AutomotivePaintColor.Name[pc.AutomotivePaintColor. |
| 20 | Name]* |
| 21 | Constant("Metallic Mint Green") |
| 22 | Lambda(.LockPath.Keylight.AcmeMotors.Cars c) => |
| 23 | Call(NameValuePair constructor) |
| 24 | Operator(=) |
| 25 | [NameValuePair]Name |
| 26 | Operator(+) |
| 27 | Operator(+) |
| 28 | c. Name |
| 29 | Constant("(") |
| 30 | Operator(+) |
| 31 | c.ModelYear |
| 32 | c.Constant(")") |
| 33 | Operator(=) |

TABLE C-continued

Example 1 LINQ Expression Tree

| 34 | [NameValuePair]Id |
| 35 | c.Id |

The particular processing performed by the facility in generating the LINQ expression tree shown in Table C is as follows.

Initially, the contextual type stack is empty, as shown in Stack Journal 1 below.

1 <empty>

Stack Journal 1

For row 1 of Table B, the facility pursues a path through steps 601, 602, 603, 604, 605, 606, 607, and 609, ultimately emitting the root node of the LINQ expression tree shown in line 1 of Table C and its subtree, the nodes shown on lines 2-34 of Table C. This path for line 1 of Table B includes recording the stack size 0 in step 605. This path for line 1 of Table B further includes recursive calls in step 606 for the nodes that are children of the root node of the Rosetta expression tree, the nodes shown on lines 2 and 21 of Table B.

For line 2 of Table B, the facility pursues the same path through steps 601, 602, 603, 604, 605, 606, 607, 609, and 610, ultimately emitting the node of the LINQ expression tree shown in line 2 of Table C and its subtree, the nodes shown on lines 3-20 of Table C. This path for line 2 of Table B includes recording the stack size 0 in step 605. This path for line 2 of Table B further includes recursive calls in step 606 for the nodes that are children of the root node of the Rosetta expression tree, the nodes shown on lines 3 and 4 of Table B.

For line 3 of Table B, the facility pursues a path through steps 601, 602, 617, 624, 627, 631, 633, and 634, ultimately emitting the node of the LINQ expression tree shown in line 3 of Table C. This path for line 3 of Table B includes, in step 633, converting the MetaRecordSet of line 3 of Table B to the typed LINQ table value "Linq.Table<.LockPath.Keylight.AcmeMotors.Cars>". In step 634, this type is added to the contextual type stack to establish the type context at this point in the traversal of the Rosetta expression tree. This change to the state of the contextual type stack is reflected in Stack Journal 2 below.

1 -LockPath. Keylight.AcmeMotors.Cars

Stack Journal 2

For line 4 of Table B, the facility pursues a path through steps 601, 614, 615, and 616, ultimately emitting the node of the LINQ expression tree shown in line 4 of Table C and its subtree, the nodes shown on lines 5-20 of Table C. As part of this path, in step 614, the facility creates a typed lambda expression around the types that are at the top of the contextual type stack. Based on the earlier processing of line 3 of Table B, as shown in Stack Record 2, at this point the contextual type stack contains the type "LockPath.Keylight-.AcmeMotors.Cars". Accordingly, the typed lambda expression that is created is the one shown in line 4 of Table C. As part of this path, in step 615, the facility recursively calls these steps for the child of the node shown on line 4 of Table B, the node shown on line 5 of Table B.

For line 5 of Table B, the facility pursues a path through steps 601, 602, 617, 618, 619, 620, and 623, ultimately emitting the node of the LINQ expression tree shown in line 5 of Table C and its subtree, the nodes shown on line 6-20 of Table C. This path includes, in step 618, recursively calling these steps to translate the left operand of the binary expression, which is the node of the Rosetta expression tree shown in line 6 of Table B. This path further includes, in step 619, recursively calling these steps to translate the right operand of the binary expression, which is the node of the Rosetta expression tree shown in line 15 of Table B.

For lines 6, 7, and 8 of Table B, the facility pursues the same path as for line 5.

6176246276286296296 For line 9 of Table B, the facility pursues a path through steps 601, 602, 617, 624, 627, 628, and 630, ultimately emitting the node of the LINQ expression tree shown in line 9 of Table C. As part of this path, in step 630, the facility converts the field path of the node shown on line 9 of Table B to a nested property expression.

For line 10 of Table B, the facility pursues a path through steps 601, 602, 617, 624, 627, 631, and 632, ultimately emitting the node of the LINQ expression tree shown in line 10 of Table C.

For line 11 of Table B, the facility pursues the same path as for line 10.

For line 12 of Table B, the facility pursues the same path as for line 5.

For line 13 of Table B, the facility pursues the same path as for line 9.

For line 14 of Table B, the facility pursues the same path as for line 10.

For line 15 of Table B, the facility pursues the same path as for line 1. This path for line 15 of Table B includes recursive calls in step 606 for the nodes that are children of the node the node shown on lines 15 of Table B of the Rosetta expression tree, the nodes shown on lines 16 and 17 of Table B. This path for line 15 of Table B includes recording the stack size 1 in step 605.

For line 16 of Table B, the facility pursues a path through steps 601, 602, 603, 612, and 613, ultimately emitting the node of the LINQ expression tree shown in line 16 of Table 3. As part of this path, in step 612, the facility converts the field "AvailablePaintColors", in the context of the Cars table, to the property expression "AvailablePaintColors". Also, in step 613, the facility adds the derived type "AvailablePaintColors" to the contextual type stack. This change to the state of the contextual type stack is reflected in Stack Journal 3 below.

1 -LockPath. Keylight.AcmeMotors.AutomotivePaintColors

2 -LockPath. Keylight.AcmeMotors.Cars

Stack Journal 3

For line 17 of Table B, the facility pursues the same path as for line 4.

For line 18 of Table B, the facility pursues the same path as for line 5.

For line 19 of Table B, the facility pursues the same path as for line 9. This path for line 19 includes dereferencing the reference the property "Name" that occurs in line 19. Because the schema shown in FIG. 4 includes a "Name" field in each the Cars table and the AutomotivePaintColors table, both the type Cars and the type AutomotivePaintColors have a name property to which the "Name" reference on line 19 could correspond. In order to resolve the ambiguity in this reference, the facility examines the current state of the contextual type stack as shown in Stack Journal 3 to determine which of these two candidate typesmaps to the alias "pc" (as opposed to "c" which is also in context but not referenced). Because the facility determines that the AutomotivePaintColors is the topmost type that is associated with the alias "pc" on the stack, it resolves the "Name" reference as referring to the Name property of the AutomotivePaintColors type.

For line 20 of Table B, the facility pursues the same path as for line 10.

When the facility's invocation of these steps for line 20 of Table B returns, the facility of these steps for line 18 of Table B resumes. When the facility's invocation of these steps for line 18 of Table B returns, the facility of these steps for line 17 of Table B resumes. When the facility's invocation of these steps for line 17 of Table B returns, the facility of these steps for line 15 of Table B resumes. In the invocation of these steps for line 15 of Table B that resumes at step 607, the facility ultimately truncates the stack to size 1, the stack size that was recorded in step 605 earlier in the invocation of these steps for line 15. This change to the state of the contextual type stack is reflected in Stack Journal 4 below.
1 -LockPath. Keylight.AcmeMotors.Cars Stack Journal 4

When the facility's invocation of these steps for line 15 of Table B returns, the facility of these steps for line 5 of Table B resumes. When the facility's invocation of these steps for line 5 of Table B returns, the facility of these steps for line 4 of Table B resumes. When the facility's invocation of these steps for line 4 of Table B returns, the facility of these steps for line 3 of Table B resumes. When the facility's invocation of these steps for line 3 of Table B returns, the facility of these steps for line 2 of Table B resumes. In the invocation of these steps for line 2 of Table B that resumes at step 607, the facility ultimately truncates the stack to size 0, the stack size that was recorded in step 605 earlier in the invocation of these steps for line 2. This change to the state of the contextual type stack is reflected in Stack Journal 5 below.
1 <empty>

Stack Journal 5

For line 21 of Table B, the facility pursues the same path as for line 4.

For line 22 of Table B, the facility pursues the same path as for line 1.

For line 23 of Table B, the facility pursues the same path as for line 5.

For line 24 of Table B, the facility pursues a path through steps 601, 602, 617, 624, 627, 628, and 630. As part of this path, in step 630, the facility converts the field "Name" to the nested property expression "Name".

For lines 25 and 26 of Table B, the facility pursues the same path as for line 5.

For line 27 of Table B, the facility pursues the same path as for line 9.

For line 28 of Table B, the facility pursues the same path as for line 10.

For line 29 of Table B, the facility pursues the same path as for line 5.

For line 30 of Table B, the facility pursues the same path as for line 9.

For line 31 of Table B, the facility pursues the same path as for line 10.

For line 32 of Table B, the facility pursues the same path as for line 5.

For line 33 of Table B, the facility pursues the same path as for line 24.

For line 34 of Table B, the facility pursues the same path as for line 9.

Returning to FIG. 3, in step 304, the facility submits the LINQ expression tree generated in step 303 for processing by the LINQ engine to perform the query. The LINQ engine in turn transforms the LINQ expression tree into database commands for direct application against the database, such as one or more SQL queries. The query result obtained from performing this query can be used in a variety of ways, such as being stored in a new database table, stored in memory, visually displayed, presented for editing locally within the query result or in the corresponding portions of the database, inserted into a document as a table, etc. After step 304, these steps return.

A number of additional examples each illustrating different aspects of the facility's operations are described hereafter.

In Example 2, a customer's database contains a dynamic table called "Devices" that contains a list of all assets (servers, laptops, routers, firewalls, etc.) that an organization owns. The administrator has also configured a dynamic table called "Facilities" that contains a list of all buildings/locations from which the organization operates. The administrator has also configured a lookup field (Foreign Key) that specifies which physical facility each device is located in. The administrator has also created a 3rd dynamic table called "Regions" that contains a list of geographic regions that the company operates within. The administrator has also configured a lookup field (Foreign Key) between the Facilities and Regions tables to identify the region in which each facility is located.

Figure 7:
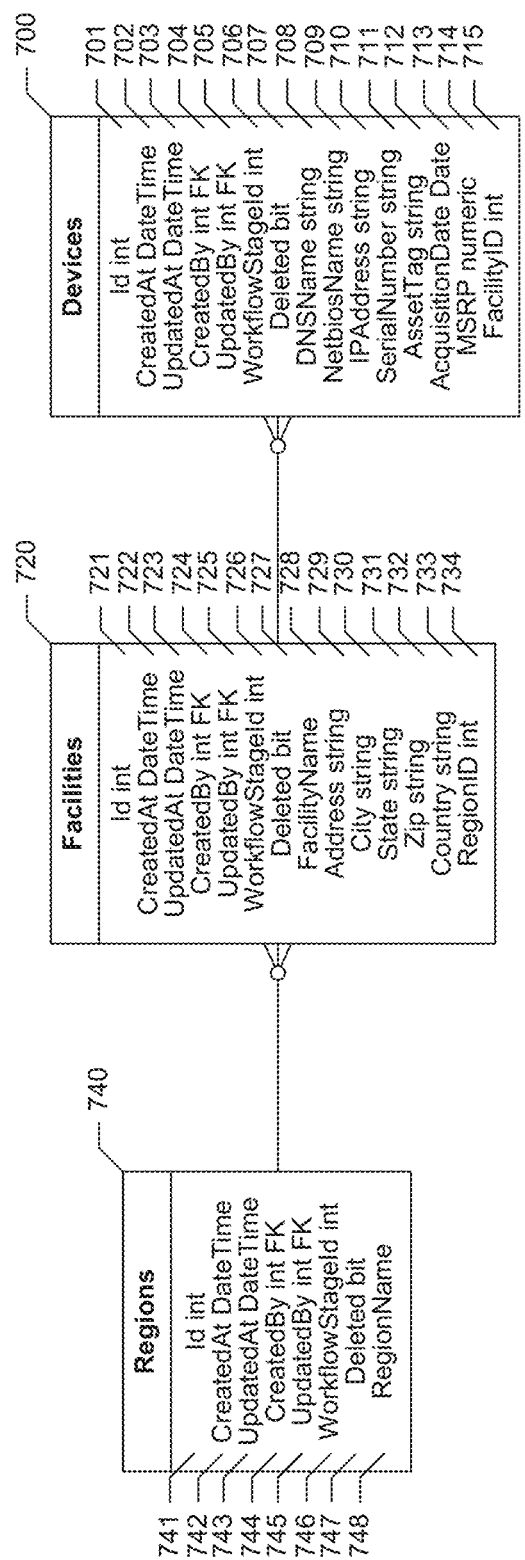
FIG. 7 is a schema diagram showing the schema of the database containing the Devices, Facilities, and Regions tables that are the subject of Example 2.

FIG. 7 is a schema diagram showing the schema of the database containing the Devices, Facilities, and Regions tables that are the subject of Example 2. It can be seen that the Devices table includes a facility ID column 715, which is a foreign key into the Facilities table. Further, the Facilities table contains a region ID column 734 which is a foreign key into the Regions table. In order to answer the question "which devices belong to which regions?," a user generates the Rosetta query shown below in Table D.

1 MetaRecordSet results=new MetaRecordSet(Page.DataSession, Domain,

2 Bundle["Devices"].Id)

3 .Where(c=>c.GetString("FacilityId", "RegionId", "RegionName")=="North

4 America")

5 .OrderBy(c=>c.GetString("DNSName");

Table D—Example 2 Rosetta Query

Based upon the Rosetta query shown in Table D, the facility generates a LINQ expression tree corresponding to the LINQ query shown below in Table E.

1 IQueryable<Device> results=Db.Devices
2 .Where(c=>c. Facility.Region.RegionName="North America")
3 .OrderBy(c=>c.DNSName);

Table E—Example 2 LINQ Query

As described above, the facility uses the LINQ engine to translate the LINQ expression tree corresponding to the LINQ query shown above in Table E into database commands such as SQL queries that are applied directly to the database.

In a further example, Example 3, more complex filtration expressions are included that specify OR operations between fields. If the user is trying to find a list of all devices that were either created before Jan. 1, 2014 OR purchased before Jan. 1, 2014, the query is relatively simple with Rosetta. Using conventional approaches, on the other hand, the user would need to create 2 separate reports, export each report, and then manually merge the reports together. Table F below shows the Rosetta query that achieves this result.

TABLE F

Example 3 Rosetta Query

| | |
|---|---|
| 1 | MetaRecordSet results = new MetaRecordSet(Page.DataSession, Domain, |
| 2 | Bundle["Devices"].Id) |
| 3 | .Where(c => c.GetDate("CreatedAt") < new DateTime("2014-01-01") \|\| |
| 4 | c.GetDate("PurchasedAt") < new DateTime("2014-01-01")) |

Table G below shows a LINQ query corresponding to the LINQ expression tree generated by the facility based on the Rosetta query shown above in Table F.

TABLE G

Example 3 LINQ Query

| | |
|---|---|
| 1 | IQueryable<Device> results = Db.Devices |
| 2 | .Where(c => c.CreatedAt < new DateTime("2014-01-01") \|\| c.PurchasedAt < new |
| 3 | DateTime("2014-01-01") |

A further example, Example 4, illustrates complex sorting capabilities. In this examples, all the devices are sorted based on the combination of the Creator's first and last names. A sample Rosetta query that accomplishes this is shown below in Table H.

TABLE H

Example 4 Rosetta Query

| | |
|---|---|
| 1 | MetaRecordSet results = new MetaRecordSet(Page.DataSession, Domain, |
| 2 | Bundle["Devices"].Id) |
| 3 | .OrderBy(c => c.GetString("CreatedBy", "LastName") + ", " + |
| 4 | c.GetString("CreatedBy", |
| 5 | "FirstName")) |

Table I below shows a LINQ query corresponding to the LINQ expression tree generated by the facility based on the Rosetta query shown in Table H.

TABLE I

Example 4 LINQ Query

| | |
|---|---|
| 1 | IQueryable<Device> results = Db.Devices |
| 2 | .OrderBy(c => c.CreatedBy.LastName + ", " + c.CreatedBy.FirstName) |

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. A computer-readable device having contents that cause a computing system to perform operations for querying dynamic data in a database, the database having a data model, the operations comprising:
    obtaining a first hierarchy, wherein the first hierarchy is based on a received database query that refers to the dynamic data, wherein the dynamic data comprises one or more user-defined database columns or one or more dynamic table names, wherein the dynamic data is not defined in the data model of the database, and wherein the first hierarchy is based, in part, on one or both of the one or more user-defined database columns or the one or more dynamic table names; and
    transforming the first hierarchy into a second hierarchy, the transforming based on the dynamic data and one or more identifiers defined in the data model of the database;
wherein the second hierarchy is used to provide a response to the received database query.

2. The computer-readable device of claim 1, wherein transforming the first hierarchy into a second hierarchy comprises:
    invoking a conversion process, in relation to a root node of the first hierarchy, that traverses the first hierarchy, wherein conversion process's traversal of the first hierarchy performs multiple iterations or recursions, each with respect to a fragment of the first hierarchy and each converting the fragment of the first hierarchy into a fragment of the second hierarchy.

3. The computer-readable device of claim 2, wherein the conversion process further comprises, for a particular iteration or recursion operating on a particular fragment of the first hierarchy:
    obtaining a LINQ-compatible method from the particular fragment of the first hierarchy by:
        determining that the particular fragment of the first hierarchy refers to a LINQ method; or
        converting a portion of the particular fragment of the first hierarchy into a LINQ-compatible expression tree; and
    wrapping a new method call expression around parameters of the LINQ-compatible method that are translated in another iteration or recursion of the conversion process.

4. The computer-readable device of claim 2, wherein the conversion process further comprises, for a particular iteration or recursion operating on a particular fragment of the first hierarchy that references the dynamic data, converting a field path associated with the dynamic data referenced by the particular fragment of the first hierarchy into a nested property expression.

5. The computer-readable device of claim 2, wherein the operations further comprise maintaining a contextual type stack during the transformation as a basis for disambiguating, in the transformation, names for database columns.

6. The computer-readable device of claim 5,
wherein the conversion process is a recursive function; and
wherein the same contextual type stack is available to each recursive call of the conversion process.

7. The computer-readable device of claim 5, wherein the conversion process further comprises, for a particular iteration or recursion operating on a particular fragment of the first hierarchy:
determining that the particular fragment of the first hierarchy refers to a lambda expression;
creating a typed lambda expression based upon one or more types that are at the top of the contextual type stack;
iteratively or recursively using the conversion process to translate a body expression of the lambda expression; and
wrapping a new lambda expression around the translated body expression.

8. The computer-readable device of claim 5, wherein the conversion process further comprises, for a particular iteration or recursion operating on a particular fragment of the first hierarchy that references the dynamic data:
converting a portion of the dynamic data referenced by the particular fragment of the first hierarchy into a LINQ table value with a particular type; and
adding the particular type of the LINQ table value to the contextual type stack.

9. The computer-readable device of claim 1, wherein the first hierarchy is an expression tree hierarchy.

10. The computer-readable device of claim 1, wherein the transforming comprises applying an object relational model engine to the first hierarchy.

11. The computer-readable device of claim 1, wherein providing the response to the received database query includes using the second hierarchy to generate, via a programmatic object, database instructions that are executed against the database.

12. The computer-readable device of claim 1, wherein the operations further comprise:
parsing the received database query that refers to the at least one user-defined database column into portions; and
generating the first hierarchy using the portions.

13. A computing system for querying dynamic data in a database, the database having a data model, the system comprising:
one or more processors; and
a memory storing instructions that, when executed by the one or more processors, cause the computing system to perform operations comprising:
obtaining a first hierarchy, wherein the first hierarchy is based on a received database query that refers to the dynamic data, wherein the dynamic data comprises one or more user-defined database columns or one or more dynamic table names, wherein the dynamic data is not defined in the data model of the database, and wherein the first hierarchy is based, in part, on one or both of the one or more user-defined database columns or the one or more dynamic table names; and
transforming the first hierarchy into a second hierarchy, the transforming based on the dynamic data and one or more identifiers defined in the data model of the database;
wherein the second hierarchy is used to provide a response to the received database query.

14. The system of claim 13, wherein transforming the first hierarchy into a second hierarchy comprises:
invoking a conversion process, in relation to a root node of the first hierarchy, that traverses the first hierarchy; and
maintaining a contextual type stack during the transformation as a basis for disambiguating, in the transformation, names for database columns;
wherein conversion process's traversal of the first hierarchy performs multiple iterations or recursions, each with respect to a fragment of the first hierarchy and each converting the fragment of the first hierarchy into a fragment of the second hierarchy.

15. The system of claim 14, wherein the conversion process further comprises, for a particular iteration or recursion operating on a particular fragment of the first hierarchy:
determining that the particular fragment of the first hierarchy refers to a LINQ method; and
wrapping a new method call expression around parameters to the LINQ method that are translated in another iteration or recursion of the conversion process.

16. The system of claim 14, wherein the conversion process further comprises, for a particular iteration or recursion operating on a particular fragment of the first hierarchy that references the dynamic data, converting a field path associated with the dynamic data referenced by the particular fragment of the first hierarchy into a nested property expression.

17. The system of claim 13, wherein the operations further comprise:
parsing the input that refers to the at least one user-defined database column into portions; and
generating the first hierarchy using the portions.

18. A method for querying dynamic data in a database, the database having a data model, the method comprising:
obtaining a first hierarchy, wherein the first hierarchy is based on a received database query that refers to the dynamic data, wherein the dynamic data comprises one or more user-defined database columns or one or more dynamic table names, wherein the dynamic data is not defined in the data model of the database, and wherein the first hierarchy is based, in part, on one or both of the one or more user-defined database columns or the one or more dynamic table names; and
transforming the first hierarchy into a second hierarchy, the transforming based on the dynamic data and one or more identifiers defined in the data model of the database;
wherein the second hierarchy is used to provide a response to the received database query.

19. The method of claim 18, wherein transforming the first hierarchy into a second hierarchy comprises:
invoking a conversion process, in relation to a root node of the first hierarchy, that traverses the first hierarchy; and
maintaining a contextual type stack during the transformation as a basis for disambiguating, in the transformation, names for database columns;
wherein conversion process's traversal of the first hierarchy performs multiple iterations or recursions, each with respect to a fragment of the first hierarchy and each converting the fragment of the first hierarchy into a fragment of the second hierarchy.

20. The method of claim 19, wherein the conversion process further comprises, for a particular iteration or recursion operating on a particular fragment of the first hierarchy that references the dynamic data, converting a field path associated with the dynamic data referenced by the particular fragment of the first hierarchy into a nested property expression.

\* \* \* \* \*